July 8, 1969   J. KRAUTKRÄMER   3,453,871
METHOD AND APPARATUS FOR DETECTING FLAWS IN MATERIALS
Filed Aug. 2, 1966
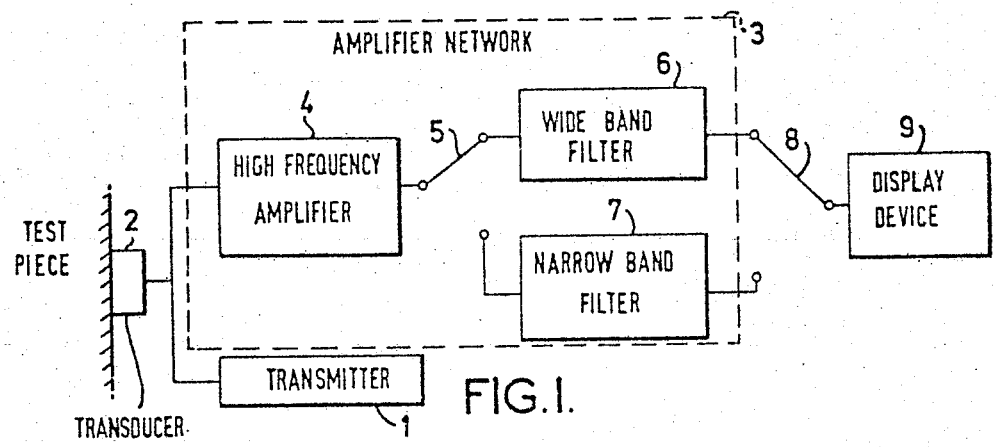
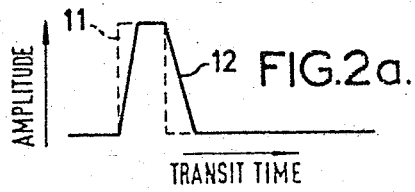
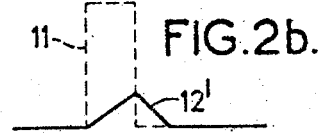
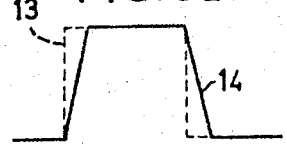
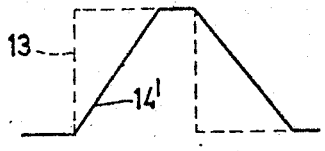
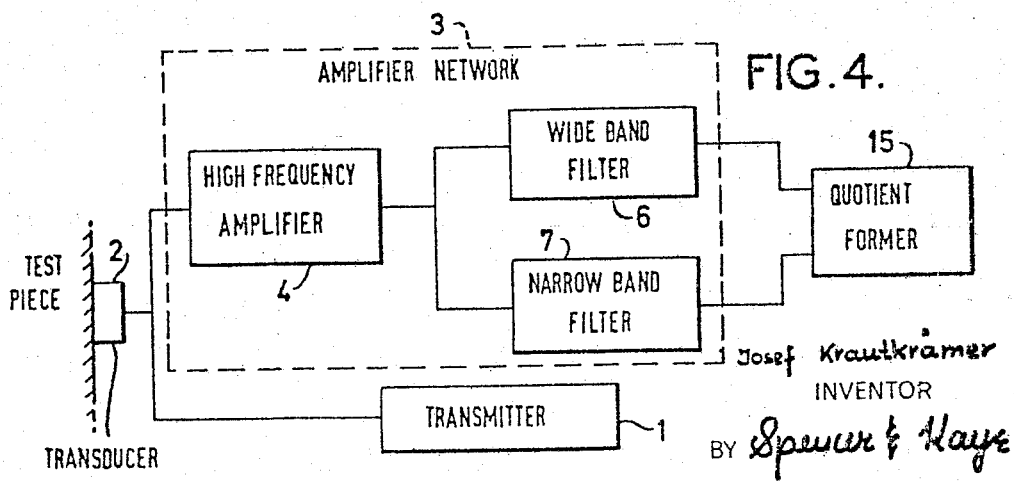
Josef Krautkrämer
INVENTOR
BY Spencer & Kaye
ATTORNEY United States Patent Office 3,453,871
Patented July 8, 1969

3,453,871
METHOD AND APPARATUS FOR DETECTING FLAWS IN MATERIALS
Josef Krautkrämer, Luxemburger Str. 449, Cologne-Klettenberg, Germany
Filed Aug. 2, 1966, Ser. No. 569,701
Claims priority, application Germany, Oct. 18, 1965, K 57,420
Int. Cl. G01n 9/24
U.S. Cl. 73—67.8   16 Claims

ABSTRACT OF THE DISCLOSURE

Ultrasonic-pulse-echo method and arrangement for testing materials for flaws. An acoustical pulse reflected from a test piece is received by an amplifier wherein it is transformed into an electrical signal and amplified. The electrical signal is also processed through a wide band filter, to provide a signal having a first echo amplitude value, and through a narrow band filter, to provide a signal having a second echo amplitude value. A signal is then formed of the ratio of the first and second echo amplitudes. This last signal is then compared to a similarly obtained echo amplitude ratio signal of a flawless material to provide a signal indicative of any flaw in the test piece.

Background of the invention

The present invention relates to nondestructive material testing and more particularly to the ultrasonic-pulse-echo method for the detection of a defect or flaw in a test piece, i.e., the deviation of the shape of a flaw from a flat plane to an irregular inclusion like slags and specially for providing a measured representative value of such flaw nature.

The pulse-echo method of ultrasonic material testing is known to provide exact values indicative of the distance of a flaw in a test piece from the point of testing. However, is is essentially more complicated to provide a representative value which indicates the size of the flaw and the shape thereof from the echo trace displayed on the screen of a cathode ray tube. In numerous instances, it is necessary to provide more information about the extent of the stationary or static transducer probe.

Many circumstances require more information about the flaw, its shape and also its species and origin, in order to determine whether the test piece meets the required standards. For example, in testing welded joints, under certain conditions, a slag inclusion may be permitted whereas a crack of the same extent due to its tendency of growth, or a planar defect of bonding due to its notch effect, results in the joint being rejected. Similar standards also apply for forged pieces since it is essential to differentiate between occlusions and cracks.

It is commonly known that the height or the amplitude of the echo pulse, by itself, provides no indication of the shape of the flaw. Although it is true that a globular flaw or a flaw which is generally irregular or is rough provides a smaller echo than a planar flaw, e.g., a circular disc-shaped flaw of the same diameter to which waves are transmitted perpendicular to its surface. However, echo amplitudes of both types of flaws may have the same value for flaws of different size. In order to separate the types of flaws, methods are known which are based on the fact that the echo amplitudes will change in a different manner depending upon the type of flaw when the direction of transmitted waves changes. For example, flaws with a plane surface provide distinct "angles of glance" in which the reflected wave is noticeably stronger than in adjacent directions. The disadvantage of this method is that it requires a displacement of the transducer probe without any change in the coupling with the surface and requires a transmitted beam to be constantly directed upon the flaw which is seldom possible. It is necessary therefore, to provide a characteristic value of the flaw shape from the echo coming from the flaw while using a static transducer probe.

It is generally known that a flaw with a nearly planar surface reflects the transmitted pulse without a noticeable change, i.e., when transmitting a pulse having a steep leading edge, a steep leading edge will also appear in the echo pulse. However, when detecting a flaw having irregular structure, there are reflected partial waves having slightly different transit times which will overlap in the echo. This interference however, will always cause the steepness of the leading edge of the pulse to be reduced. Also, the maximum echo amplitude is only obtained after a larger number of oscillations and often results in a plurality of maximum instead of a single maximum. A person of skill in this art, i.e., an experienced operator, is able to recognize the characteristic deviations of both types of typical flaws when the echo pulses are displayed on a fluorescent screen of apparatus providing a rectified video indication of the echo pulse and in which rectification a sufficiently large portion of the high frequency waves is passed. The experienced operator is generally able to determine the type of flaw from the displayed trace of the echo, since for a steep echo wave front, only a few low amplitude oscillations are displayed before the maximum amplitude in contradistinction to an echo trace having a less steep wave front.

However, it is even difficult for such an operator to classify mixed types of both types of flaws or to recognize the more dangerous flaw occuring in a combination of both types, for example, an occlusion occuring with a fissure. Accordingly, this method clearly depends upon the operator and his efficiency in observing the echo. However, when it is desired to provide for automatic testing, the flaw indication is recorded continuously and for this purpose, the echo amplitude is converted into a voltage and recorded as such. When this occurs, the shape of the echo can not be clearly recognized. Although, it is true when some types of recording methods, it is possible to display the high frequency trace, this trace is not always complete and requires complicated screen representations and a complicated photographic recording method.

One prior art method includes the use of a frequency analyzer for determining the frequency distribution of the echo by comparing the echo with that of the transmitted pulse. This method, however, requires complicated equipment as well as a large amount of time and is therefore not suitable for continuous testing with a continuous recording. A multiple frequency method is also known in which pulses of different frequencies are transmitted sequentially or simultaneously. However, it has not as yet been determined whether this method overcomes the disadvantages of the other prior art methods.

Summary of the invention

It is therefore an object of the present invention to provide a pulse-echo method of ultrasonic testing for detecting flaws and wherein by using a static transducer probe a measurable value indicative of the flaw shape is obtained from the flaw echo.

It is another object of the present invention to provide a method with facilities the analysis and detection of the shape of a flaw even for an inexperienced operator.

It is a further object of the present invention to provide a method in which the analysis and detection of the shape of the flaw is independent of the operator and is automatically provided.

It is yet a further object to provide a method for the ultrasonic material testing in which the cost of the apparatus is reduced as compared with prior art methods.

According to the present invention, the received echo voltage is fed through an amplifier having a rise and decay time which can be increased as compared with a preset rise and decay time for the amplifier. The influence of the increase of the rise time on the amplitude of the output from the amplifier as compared with the amplitude of the output when the amplifier is in its preset condition, is observed for an indication of the type of flaw. Planar flaws produce a narrow echo pulse whereas irregular flaws produce a wider echo pulse. The narrow echoes of planar flaws according to the present invention produce smaller echo amplitudes as compared with the echo amplitudes reflected from an irregular flaw when passed through an amplifier having an increased rise time whereas the same echo amplitude is produced for both narrow and wide pulses when these pulses are passed through an amplifier having the preset shorter rise time.

In accordance with the method of the present invention, the apparatus therefor includes rectifying means for the received echo, and amplifier means in which the rise and decay time of the amplifier may be increased, and means at the output of the amplifier for displaying the output therefrom. It is also possible with the present invention to amplify the rectified echo simultaneously by means of, in effect, two different video amplifiers having different bandwidths and to display the resultant pulses on screens or a recording device in order to form the relationship of the echo amplitudes so as to determine the type of flaw.

*Brief description of the drawing*

FIGURE 1 is a schematic representation of a system for carrying out the method of the present invention.

FIGURE 2a shows in broken line the shape of an idealized narrow echo pulse reflected from a planar flaw and the solid line shows the pulse at the output of the video amplifier.

FIGURE 2b shows two pulse shapes corresponding to the representation in FIGURE 2a in which the echo pulse is passed through a video amplifier having a narrower bandwidth.

FIGURE 3a shows in dash line an ideal shape of an idealized wide echo pulse reflected from an irregular flaw and the solid line represents the pulse at the output of the video amplifier.

FIGURE 3b shows two pulses corresponding to the representation in FIGURE 3a in which the echo pulse is passed through a video amplifier having a narrower bandwidth.

FIGURE 4 is a schematic representation of another system for carrying out the method of the present invention.

*Detailed description of the preferred method and embodiment*

Referring now to the drawings, there is shown in FIGURE 1 a system in block diagram form for carrying out the method of the present invention. As shown, as in conventional pulse echo devices for ultrasonic material testing, a transmitter 1 is provided for supplying the high frequency electric pulses to a transducer 2 which emits the acoustic signals toward the test piece and receives the echo therefrom. From the transducer, the echoes which have been transformed into electric signals are fed to an amplifier network 3 including a conventional high frequency amplifier 4 and switch 5, shown schematically, for selectively connecting the output of the high frequency amplifier 4 to a wide band filter 6 or to a narrow band filter 7 whereby the amplifier 4 together with the switch and the filters form the amplifier network. When the switch is in the position shown, that is, connected to the wide band filter, the rise time for the amplifier network 3 is preset in its normal condition whereas when the switch 5 is connected to the narrow band filter 7, the rise time for the amplifier network is increased. A further switch 8 is provided for selectively connecting the outputs of the wide band filter and the narrow band filter to a display device 9 wherein the echo amplitude is indicated. The display device may be an oscillograph on which the rectified echo pulses are represented in amplitude with respect to a time vector. The display device may also be arranged so as to provide an output to monitors which are conventionally known in the material testing art or may be replaced by such monitors. These monitors generally include gate amplifiers which pass only the desired echo and convert the amplitude thereof into an electrical value which is displayed. In the system of FIGURE 1, which is only an example of the apparatus for carrying out the present method, the rectifying of the high frequency pulses is not indicated in detail but can readily be performed in front of the frequency band filters, for example, in the amplifier 4 or the rectification may take place within the display device 9. Generally, the increase of the rise time for the amplifier network can be achieved by decreasing the cut-off frequency, by using low pass filters and also by the use of special integration circuits, for example, a Miller integrator. It should be noted, that in accordance with the present invention, only a static transducer arrangement is required and even a single probe may be used with only a single ultrasonic frequency being transmitted.

FIGURES 2 and 3 show the characteristic pulses produced according to the present invention. There is shown in broken lines in FIGURE 2a the idealized shape of a reflected pulse 11 and in FIGURE 3a the idealized shape of a reflected pulse 13, these pulses having been passed without distortion through an amplifier having an extremely short rise time and also having been rectified so that only the envelope of the original high frequency reflected pulse is shown. As discussed previously, a narrow transmitted pulse will be reflected from a planar flaw as a narrow echo pulse whereas the same transmitted pulse will be reflected from an irregular flaw as a wider pulse and therefore FIGURES 2 and 3 correspond respectively to these types of flaws. In the case of the pulse 11 shown in FIGURE 2a, in practice when this pulse is passed through a video amplifier having a short rise time, i.e., a wide bandwidth, the pulse will appear at the output of such amplifier as a pulse 12 as shown in solid lines with the leading and trailing edge being reduced in steepness while the pulse amplitude remains the same as that of pulse 11. As shown in FIGURE 3a, a pulse 14 is formed from the pulse 13 and the leading and trailing edge of this pulse is also reduced in steepness.

As shown in FIGURE 2b, the same echo pulse 11 shown in broken lines is passed through a video channel of a narrow bandwidth amplifier having a greater rise time. Thus, due to the rise and decay time of the amplifier, the steepness of the leading and trailing edge of the output pulse 12' is sharply reduced and simultaneously, the amplitude of the output pulse is reduced since due to the bandwidth of the amplifier, the maximum aplitude value for the input echo pulse cannot be obtained. Accordingly, the normal rise time for the amplifier, i.e., the preset condition, is chosen to be small enough so that the narrowest pulse reflected, e.g., an echo from a smooth rear surface of the tested material will not experience an amplitude reduction.

FIGURE 3b is analogous to FIGURE 2b in that it shows an output pulse 14' from a narrow bandwidth amplifier, however, in contradistinction to the representations of FIGURES 2a and 2b, the output pulses 14 and 14' of FIGURES 3a and 3b, respectively, are passed from both the wide bandwidth amplifier and narrow bandwidth amplifier without any reduction in the amplitude thereof. This occurs because the reflected pulse from an irregular flaw is wider than the transmitted pulse and the reflected pulse width is sufficient to overcome the effect of the bandwidth of the amplifier and therefore is not reduced in amplitude.

Accordingly, the voltage waveform of an undisturbed echo from the smooth rear surface of the tested material is amplified in an amplifier and a first echo amplitude value is obtained. Thereafter, the bandwidth of the amplifier is reduced and the same echo voltage waveform is amplified with a second echo amplitude value being obtained. A value indicative of the relationship of these two echo amplitude values is then formed and also a corresponding value indicative of the relationship of the flaw echo amplitude values from the reflected echo voltage waveforms will also be formed. Thereafter, a ratio of the individual echo amplitude relationships with respect to the undisturbed echo amplitude relationship will be formed, measured or recorded, which ratio will be indicative of the deviation of the flaw shape from a smooth plane. In practice the amplifier is provided with a narrow bandwidth having a rise and decay time corresponding to the echo pulse width of the smallest irregular flaw which can be distinguished from the echo pulse width of a flaw of a plane shape. On the other hand the pulse width of the smallest irregular flaw must be much wider than a flaw of a plane shape that there is a clear difference in the echo amplitude ratio between planar shaped flaws with small echo pulses and irregular flaws with wider echo pulses.

FIGURE 4 is a schematic representation of a modification of the embodiment of FIGURE 1 for carrying out the method of the present invention in which instead of successively measuring the pulse amplitudes, the desired measured value can be directly indicated. The high frequency amplifier 4 provides an output to both the wide band filter 6 and the narrow band filter 7 simultaneously. The outputs from the filters are then simultaneously fed into a quotient forming device 15 which, for example, may be an electromechanical quotient measuring computer or a corresponding electronic circuit. Such a device provides the ratio of the echo amplitudes directly for the different rise times so that the value may be read-off from a measuring instrument or as an electrical output voltage for recording purposes. This device is continuously operated during the automatic scanning or testing of the test pieces, for example, the testing of welded joints.

It will be understood that the above description of the present invention is susceptible to various modications, changes, and adaptations, and the same are intended to be comprehended within the meaning and range of equivalents of the appended claims.

What is claimed is:

1. An ultrasonic-pulse-echo method for testing materials to detect flaws therein and to provide a measured value thereof, the method comprising the steps of:
   transmitting an acoustical pulse toward the test piece;
   receiving an acoustical echo of the transmitted pulse from the test piece;
   transforming the echo into an electrical signal;
   amplifying and wide band filtering the electrical signal to provide a signal having a first echo amplitude value;
   amplifying and narrow band filtering the electrical signal to provide a signal having a second echo amplitude value;
   forming a signal of the ratio of the echo amplitudes as a value indicative of the flaw; and
   forming a signal of the ratio of the echo amplitudes for a flawless material having a smooth rear wall, and forming a signal of the ratio value of the echo amplitude ratio for said test piece and the echo amplitude ratio of the flawless material, which signal is indicative of the flaw in the test piece.

2. The method as defined in claim 1 and further comprising the steps of measuring the value of the signal of the ratio of the echo amplitude ratios.

3. The method as defined in claim 1 and further comprising the step of recording the value of the signal of the ratio of the echo amplitude ratios.

4. An ultrasonic-pulse-echo method for testing materials to detect flaws therein and to provide a measured value thereof, the method comprising the steps of:
   transmitting an acoustical pulse toward the test piece and a reference sample of flawless material, having a smooth rear wall respectively;
   receiving acoustical echoes of the transmitted pulse from the test piece; and from the flawless sample, respectively;
   transforming each said echo received into an electrical signal;
   amplifying and wide band filtering said electrical signals to provide signals having a first and second echo amplitude value, respectively;
   amplifying and narrow band filtering the corresponding electrical signals of the test piece and the flawless sample, respectively, to provide a third and fourth signal respectively having corresponding echo amplitude values;
   forming a signal of the ratio value of said first and third echo amplitudes for said flawless material, and forming a signal of the ratio value of said second and fourth echo amplitudes for a test piece and then forming a third signal of the ratio of these echo amplitude ratios, which signal value is indicative of the flaw in the test piece.

5. The method as defined in claim 1 wherein the steps of amplifying and wide band filtering and amplifying and narrow band filtering of said electrical signals is carried out by passing the electrical signal through an amplifier having a first bandwidth, decreasing the bandwidth of such amplifier and passing the electrical signal therethrough.

6. The method as defined in claim 4 wherein the steps of amplifying and wide band filtering and amplifying and narrow band filtering of the electrical signal are carried out by simultaneously passing the electrical signal through amplifiers having different bandwidths, and further including the step of displaying the output of each amplifier.

7. An ultrasonic-pulse-echo method for testing materials to detect flaws therein and to provide a measured value thereof, the method comprising the steps of:
   transmitting an acoustical pulse toward the test piece;
   receiving an acoustical echo of the transmitted pulse from the test piece;
   transforming the echo into an electrical signal;
   amplifying and wide band filtering the electrical signal to provide a signal having a first echo amplitude value;
   amplifying and narrow band filtering the electrical signal to provide a signal having a second echo amplitude value;
   forming a signal of the ratio of the echo amplitudes as a value indicative of the flaw;
   passing the electrical signal through an amplifier having a first bandwidth, and decreasing the bandwidth of such amplifier and passing the electrical signal therethrough, in carrying out the steps of amplifying and wide band filtering and amplifying and narrow band filtering of the electrical signal; and
   increasing the rise and decay time of such amplifier in carrying out the step of decreasing the bandwith of the amplifier.

8. An ultrasonic-pulse-echo method for testing materials to detect flaws therein and to provide a measured value thereof, the method comprising the steps of:
   transmitting an acoustical pulse toward the test piece;
   receiving an acoustical echo of the transmitted pulse from the test piece;
   transforming the echo into an electrical signal;
   amplifying and wide band filtering the electrical signal to provide a signal having a first echo amplitude value;

amplifying and narrow band filtering the electrical signal to provide a signal having a second echo amplitude value;
forming a signal of the ratio of the echo amplitudes as a value indicative of the flaw;
passing, simultaneously, the electrical signal through amplifiers having different bandwidths in carrying out the steps of amplifying and wide band filtering and amplifying and narrow band filtering of the electrical signal;
displaying the output of each amplifier;
gating a portion of the output signal from each amplifier for providing a predetermined echo signal;
processing the predetermined echo signal into a suitable form for continuous recording;
forming a signal of the echo amplitude ratio from the predetermined echo signals; and
continuously recording the formed echo ratio signal during the continuous ultrasonic testing.

9. The method as defined in claim 8 and further comprising the step of simultaneously recording the echo amplitude and the ratio of the echo amplitudes.

10. An ultrasonic-pulse-echo testing arrangement for detecting flaws in a test piece comprising, in combination:
transmitter means for generating high frequency pulses;
transducer means for transmitting a pulse toward a test piece in response to a pulse from said transmitter means, for receiving an echo of the transmitted pulse from the test piece, and for providing an output signal of such echo;
amplifier means coupled to said transducer means for receiving said output signal and for processing the same, said amplifier means including means forming a wide band amplifier and means forming a narrow band amplifier for providing a wide band echo amplitude signal and a narrow band echo amplitude signal; and
means coupled to said amplifier means for forming the ratio of the echo amplitude signals as a value indicative of the flaw.

11. An arrangement as defined in claim 10 wherein said amplifier means includes a high frequency amplifier, a wide band filter and a narrow band filter, said filters being selectively connected to said high frequency amplifier for forming said wide band amplifier and said narrow band amplifier.

12. An arrangement as defined in claim 10 wherein said wide band amplifier and said narrow band amplifier are connected to said transducer means for simultaneously processing said output signal from said transducer means.

13. An arrangement as defined in claim 12 wherein said amplifier means comprises a high frequency amplifier for receiving said output signal from said transducer means and a wide band filter and a narrow band filter for simultaneously receiving the signal from said high frequency amplifier.

14. An arrangement as defined in claim 10 and further including means for varying the bandwidth of said amplifier means.

15. An arrangement as defined in claim 10 and further comprising means for recording the ratio of the echo amplitudes.

16. An ultrasonic-pulse-echo method for testing materials to detect flaws therein and to provide a measured value thereof, the method comprising the steps of:
transmitting an acoustical pulse toward the test piece;
receiving an acoustical echo of the transmitted pulse from the test piece;
transforming the echo into an electrical signal;
amplifying and wide band filtering the electrical signal to provide a signal having a first echo amplitude value;
amplifying and narrow band filtering the electrical signal to provide a signal having a second echo amplitude value;
forming a signal of the ratio of the echo amplitudes as a value indicative of the flaw;
passing the electrical signal through an amplifier having a first bandwidth, and decreasing the bandwidth of such amplifier and passing the electrical signal therethrough, in carrying out the steps of amplifying and wide band filtering and amplifying and narrow band filtering of the electrical signal;
setting the bandwidth for wide band filtering at a value such that a pulse reflected from the smooth rear wall of a flawless material will not experience an amplitude reduction when amplified and filtered; and
setting the bandwidth for narrow band filtering at a value corresponding to the smallest irregular flaw to be distinguished from a flaw of plane shape like a crack to be detected.

References Cited

FOREIGN PATENTS 1,297,213   5/1962   France.

RICHARD C. QUEISSER, *Primary Examiner.*

J. R. FLANAGAN, *Assistant Examiner.*